United States Patent
Gillespie et al.

(10) Patent No.: US 7,035,839 B1
(45) Date of Patent: Apr. 25, 2006

(54) DOCUMENT MANAGEMENT EXTENSION SOFTWARE

(76) Inventors: David Gillespie, Level 8, 10 Queens Road, South Melbourne, Victoria 3004 (AU); Frank Stranges, Level 8, 10 Queens Road, South Melbourne, Victoria 3044 (AU)

( * ) Notice: Subject to any disclaimer, the term of this patent is extended or adjusted under 35 U.S.C. 154(b) by 0 days.

(21) Appl. No.: 09/646,946

(22) PCT Filed: Mar. 24, 1999

(86) PCT No.: PCT/AU99/00201

§ 371 (c)(1),
(2), (4) Date: Oct. 16, 2000

(87) PCT Pub. No.: WO99/49388

PCT Pub. Date: Sep. 30, 1999

(30) Foreign Application Priority Data

Mar. 24, 1998 (AU) .................................. PP2522

(51) Int. Cl.
*G06F 17/30* (2006.01)

(52) U.S. Cl. .......................... 707/2; 707/9; 715/513; 717/101

(58) Field of Classification Search ............ 707/104.1, 707/100, 1–5, 8–10; 713/500.1–524; 709/203; 715/513–516, 716, 721, 727–729, 817–820, 715/853; 717/100–101, 114
See application file for complete search history.

(56) References Cited

U.S. PATENT DOCUMENTS

| | | | | |
|---|---|---|---|---|
| 5,544,051 | A | | 8/1996 | Senn et al. ..................... 707/3 |
| 5,568,640 | A | * | 10/1996 | Nishiyama et al. ............ 707/1 |
| 5,638,504 | A | * | 6/1997 | Scott et al. ................. 715/530 |
| 5,805,889 | A | | 9/1998 | Van De Vanter ............ 717/107 |
| 5,845,067 | A | * | 12/1998 | Porter et al. ................ 713/200 |
| 5,887,171 | A | * | 3/1999 | Tada et al. ................... 719/317 |
| 5,893,908 | A | | 4/1999 | Cullen et al. .................. 707/5 |
| 6,006,227 | A | * | 12/1999 | Freeman et al. ............... 707/7 |
| 6,061,695 | A | * | 5/2000 | Slivka et al. ................ 715/513 |
| 6,119,117 | A | * | 9/2000 | Yoda et al. ................... 707/10 |
| 6,599,324 | B1 | * | 7/2003 | Saito et al. ................. 715/513 |
| 6,810,404 | B1 | * | 10/2004 | Ferguson et al. ........... 707/200 |
| 2001/0054042 | A1 | * | 12/2001 | Watkins et al. ............. 707/100 |

FOREIGN PATENT DOCUMENTS

JP           4236656         8/1992

* cited by examiner

*Primary Examiner*—G. Robinson
*Assistant Examiner*—Cheryl Lewis
(74) *Attorney, Agent, or Firm*—Edwin D. Schindler (57) ABSTRACT

A document management extension system for use as an extension to document collection and management software, includes an information store having a database and a messaging system for storing documents managed by the document collection and management software, with stored documents being stored in either the database, the messaging system, or both, of the information store. The document management extension system also includes document indexing of the database or messaging system for the documents stored therein, along with processing of the documents stored in either the database or messaging system of the information store.

31 Claims, 2 Drawing Sheets

DOCUMENT MANAGEMENT EXTENSION SOFTWARE

BACKGROUND OF THE INVENTION

1. Technical Field of the Invention

This invention relates to a computer software program for an improved document management system.

The basic function of document management software is to manage a document's lifetime from creation to destruction and at least give someone an even chance of locating the document by being able to search on more than an eight-dot-three pseudonym for the document.

Conversely, enterprise document management software was designed to solve the problems of large organizations with thousands of networked computers. This type of software was designed to securely and dependably manage every electronic document produced within the enterprise and reliably retrieve those documents wherever, and whenever, required.

Enterprise document management software typically has the following components: A database, a browser interface, a search interface, and a method of intercepting file save and open calls.

The database is used to store information about a document other than its file name. Information such as the author, the typist, the date of creation and notes are typical fields, however, most importantly, are the database controls where the file is stored and the access to that location. The database record contains a pointer to the file system saying "find this file." It also generally contains information as to which application should be launched to edit the document, such as MICROSOFT WORD or MICROSOFT EXCEL (trademarks of the Microsoft Corporation.)

The database is, in effect, a Connection Manager.

2. Description of the Prior Art

Many enterprise document management systems provide an interface whereby users can browse, in some logical fashion, through the documents available to them.

All enterprise document management systems provide some form of search ability with respect to the fields recorded in the database. The responsiveness of the search is entirely dependent on the database chosen for the back-end.

Some of these systems also offer full text searching of the contents of the electronic documents themselves.

Many of the enterprise document management systems are able to enforce proper profiling and storage documents by intercepting calls made by the document production software to the file system. There are two ways in which this can be achieved. One is to use macros to alter behavior of the production application, or interfere, with the low level operating system code used by the network to properly manage the file system. The macro method usually involves the launch of a part of the document management system in response to a "file save" or "open" command. Most systems, therefore, require that their software be continuously running in the background in order to respond to these calls, this, however, can have dramatic effects on the operator's system performance. As there is only so much RAM to share between applications, the more that can be made available for production applications, the better.

The problem with many of the enterprise document management systems, which are essentially targeted at the large corporate market, is that, apart from being expensive software, they do not cater to small- to medium-sized organizations.

Since the first enterprise development systems became available, Network Operating Systems (NOS) have been quietly maturing in the background. Modem NOS's, such as MICROSOFT NT4 SERVER (trademark of Microsoft Corporation for a network operating system) have been built-in object (document) level security, replication and file systems databases, such as MICROSOFT EXCHANGE (trademark of Microsoft Corporation), eliminating the need to rebuild these things as expensive add-ins.

NOS's have matured to the point where much of what a document management system does is already built into the NOS or tightly integrated components, such as, MICROSOFT EXCHANGE and MICROSOFT OFFICE (both trademarks of Microsoft Corporation.)

SUMMARY OF THE INVENTION

It is, therefore, an object of the present invention to provide a document management extension system for use as an extension to a document collection and management software program, wherein the document management extension system saves the content (or object) and metadata (or index data) in the information store (i.e., database or messaging system, or message store) within, for example, MICROSOFT EXCHANGE, rather than saving the content or metadata in a file system.

It is a further object of the present invention to provide a document management system which is able to be utilized by organizations of all sizes, as well as individuals.

The invention, in its broadest sense, is a document management extension system for MICRO-SOFT EXCHANGE (trademark of Microsoft Corporation), wherein the system merges the functionality of index databases, file repositories and messaging systems, using MICROSORT EXCHANGE (trademark), and leverages the tight integration of MICROSOFT EXCHANGE (trademark) and an NT Server for security and redundancy management.

In this specification, any reference to a particular software version is an indication that the system of the invention operates with at least that particular version. As software is upgraded, so will the system, which, when necessary, will be upgraded to operate with later version of the same software.

DETAILED DESCRIPTION OF THE DRAWING AND PREFERRED EMBODIMENTS

Document Management Extensions (DME) for MICROSOFT EXCHANGE (trademark) is a document management system for everyone. DME merges the traditional functionality of index databases, file repositories and messaging systems by using MICROSOFT EXCHANGE 5.0 (trademark of Microsoft Corporation) and leverages the tight integration of MICROSOFT EXCHANGE 5.0 and an NT SERVER 4.0 (trademark of Microsoft Corporation) for security and redundancy management.

DME is tightly integrated with host applications. There is no standalone application, rather numerous interfaces to the Document Management Extensions. The only user interface to DME is via dialogs in one's applications or via the Find application.

This specification, in detail, describes each of these interfaces and provides technical descriptions of the interfaces.

Document Production Application Integration

File Open and File Save/Save As

Applications supported by DME in Release 1.0 were MICROSOFT WORD 97 (trademark), POWERPOINT 97, BINDER 97, EXCEL 97 and OUTLOOK 97 (trademarks.) Eastman (trademark of WANG) Image Viewer and MICROSOFT WINDOWS PAINTBRUSH (trademark of Microsoft Corporation) are also supported. At some future time, non-MICROSOFT OFFICE ("MICROSOFT OFFICE" is a trademark of Microsoft Corporation) applications may be directly supported. Three MICROSOFT OFFICE 97 applications support the Open Document Management API. DME leverage this support. Non-ODMA compliant applications such as MICROSOFT OUTLOOK 97 (trademark) and MICROSOFT EXCEL 97 (trademark) use macro interfaces to arrive at the same result. From the user's point of view all applications behave in exactly the same fashion.

MICROSOFT WORD 97, Binder 97 and PowerPoint 97 (Trademarks)

The Open Document Management API (ODMA) is the acknowledged standard API for access to Document Management Systems. MICROSOFT WORD 97, BINDER 97 and POWERPOINT 97 (trademarks) are ODMA compliant applications. MICROSOFT WORD 97, BINDER 97 and POWERPOINT 97 register themselves with DME using an ODMRegisterApp call to the ODMA Connection Manager (ODMA32.DLL). ODMA returns a handle for the application to use for identification in all subsequent calls. When the application exits, it calls ODMUnRegisterApp to return the handle. As part of this registration process, ODMA searches the Registry for entries in HKEY_Local_Machine/Software/Classes/ODMA32. It tries to connect to the first Document Management System (DMS) key with a sub-key named DEFAULT. The value of the DMS key is the path to the DME DLL that provides the functionality specified by ODMA. All screens for selecting and setting properties of documents come from Document Management Extensions for MICROSOFT EXCHANGE (trademark.) The DME search application (discussed separately below) interacts independently with the DME DLL rather than via an application.

MICROSOFT EXCEL 97 and MICROSOFT OUTLOOK 97 (Trademarks)

Neither MICROSOFT EXCEL 97 nor MICROSOFT OUTLOOK 97 are ODMA compliant applications. For these applications macrocode replaces the ODMA32.DLL calls in the ODMA model. The macros are not editable by the user. To the user, there is no difference in application behavior as between an ODMA and a non-ODMA application.

Internet Browser Integration

The interaction between MICROSOFT EXCHANGE SERVER and Internet/Intranet users is provided by Microsoft Corporation's Internet Information Server (IIS) 3.0 Active Server Pages in conjunction with MICROSOFT EXCHANGE SERVER 5.0 Active Server Components. MICROSOFT OUTLOOK or MICROSOFT EXCHANGE user sessions establish direct MAPI connections with MICROSOFT EXCHANGE SERVER, whereas DME and browsers use Active Messaging objects to access the MICROSOFT EXCHANGE public folders.

DME Document Management Features

DME Object Model

Figure 1:
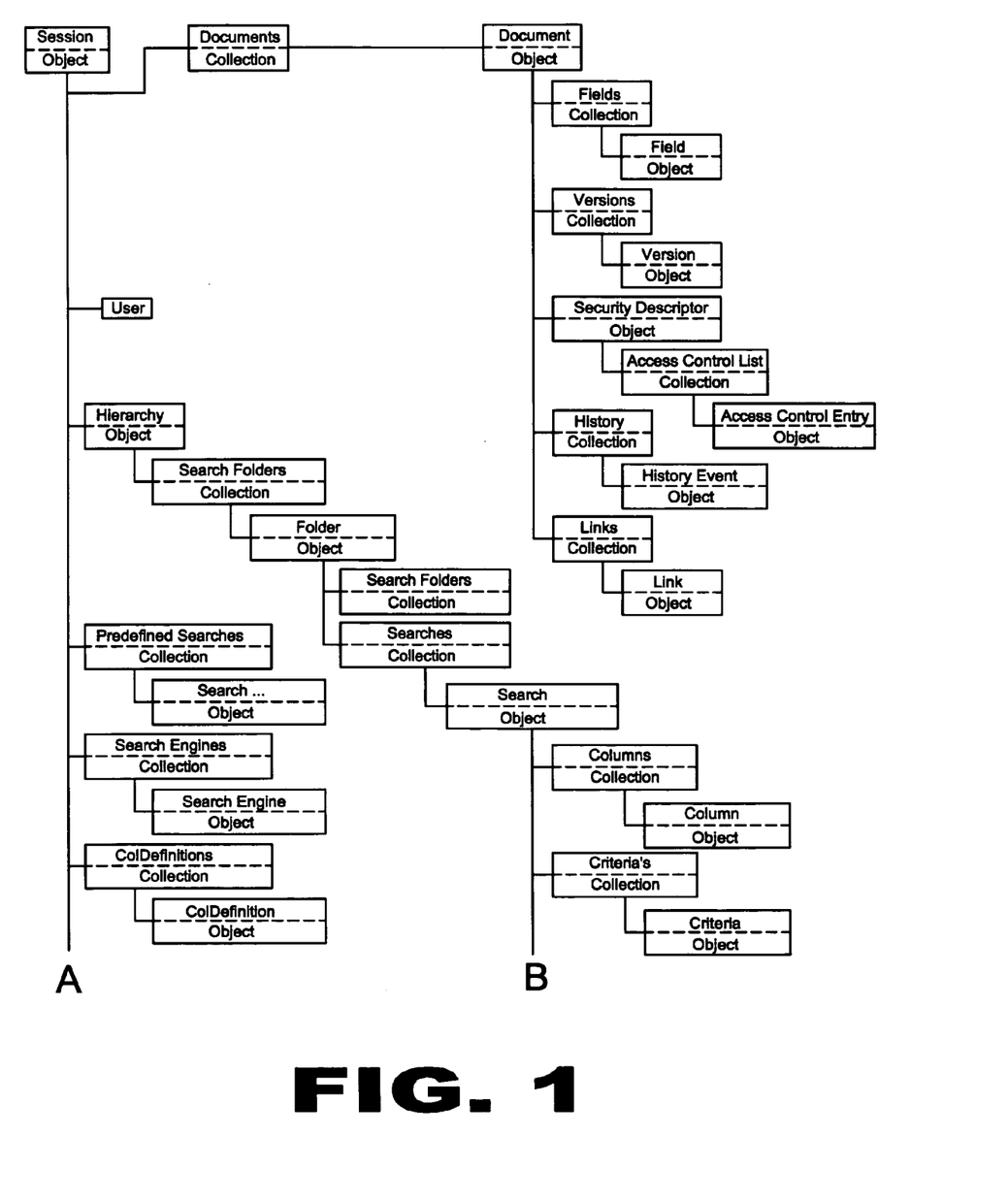
FIG. 1 is a flow chart showing the containment hierarchy implemented by document management extension ("DME") software, with each indented object being a child of the object under which it is indented and with an object being the parent of every object at the next level of indentation there-under; and, FIG. 2 is a continuation of the flow chart of FIG. 1.
Figure 2:
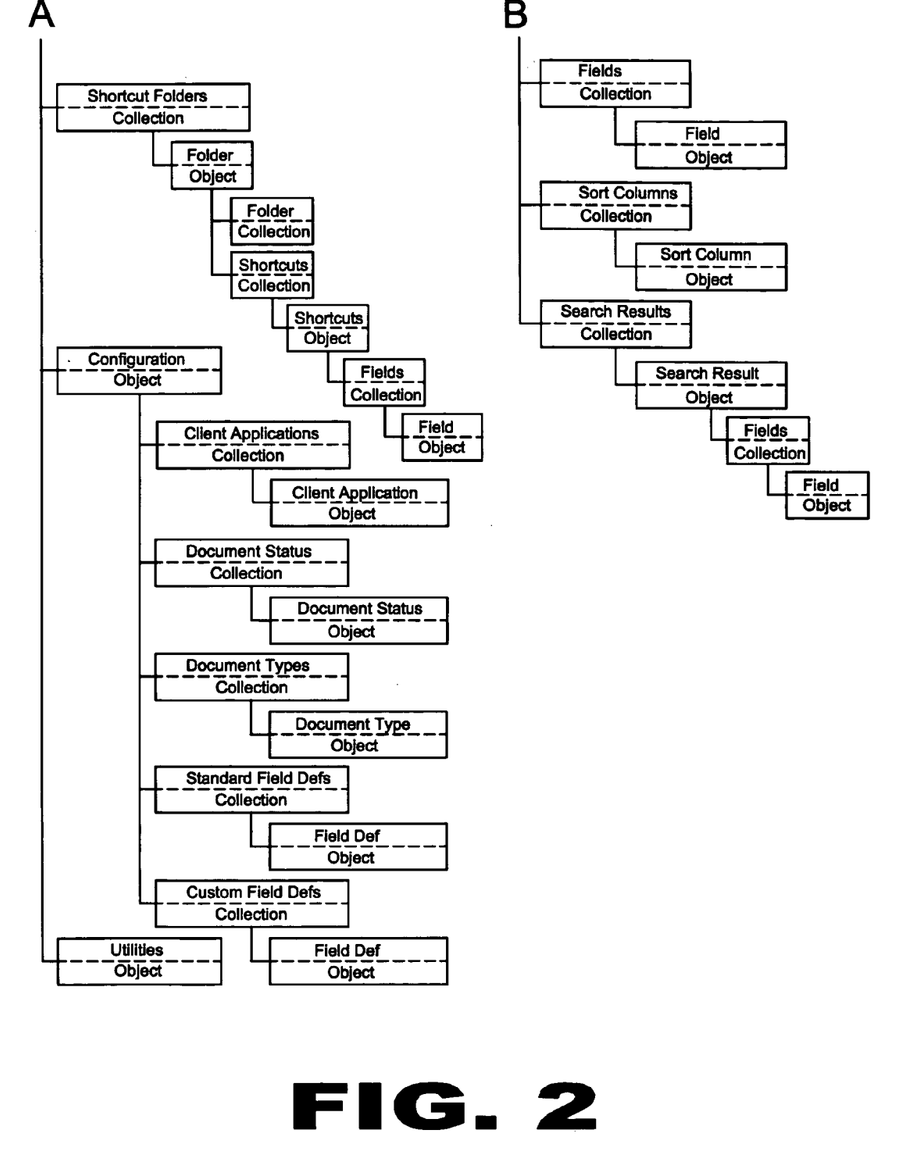

FIGS. 1 and 2, in combination, present a flow chart of the object model for Document Management Extensions software, which is hierarchical. The flow chart shows the containment hierarchy implemented in DME. Each indented object is a child of the object is a child of the object under which it is indented. An object is the parent of every object at the next level of indentation under it. For example, the Documents collection and the Configuration object are both child objects of a Session object and a Fields collection is a parent object of a Field object.

The term "collection" is used to represent an object which allows access to one or more child objects. For example, the Field object presents one piece of information about a document, and a "document" contains one or more such pieces of information. In fact, it would be advantageous to have a simple way of managing access to the group of document fields. This is the purpose of the Fields collection. A document has a single Fields collection object, which, in turn provides access to any of the document's Field objects.

Versioning

Many users need to keep track of who did what to a document and when. With versioning, users can go back in time and see who made what changes to a document on various dates.

Versioning in all supported applications is accomplished by adding historical copies of documents to the MAPI record for the document.

Versions of a document can be seen within the document properties and can be accessed directly from Document Find.

Check In/Out to Local Machine

Before examining Check In and Check Out it is worth looking at how DME transacts with the MICROSOFT EXCHANGE Server in a normal File Open. The Checkout procedure is merely an extension of that functionality. Both procedures are designed to ensure maximum redundancy in operation.

How Does it Work?

When a user opens a document using Document Management Extensions for MICROSOFT EXCHANGE, the following process occurs:

1. The DME Service sets a flag in the DME object Store by setting the status property to OPEN and by inserting the time and user's name in the StatusInfo property.
2. The DME Service copies the object from the public DME store to the user's mailbox.
3. The document is copied from there to a local TEMP directory for editing by the DME user.

When a document is closed or saved the following process occurs:

1. The document is moved from the local TEMP file to the TEMP folder in the OST File (if the server is offline) or the TEMP folder in the user's mailbox (if the server is online).
2. All documents are moved from the user's mailbox to the DME store.
3. For each document, the Status property is reset to AVAILABLE and the StatusInfo property is set to null.

In fact online/offline detection automatically switches users between integration with the document manager and working offline. If the network or server should fail while a document is open, the user can continue to work without even being aware of the outage. As soon as the network is available the user's Offline file will automatically resynchronize with the User's Mailbox on the server. Users are able to Check documents out to their local machine using a right click command in any dialog (see context menus below). DME allows you to save these documents to the file system so that you can access them when not connected to the server or send them to a user without access to the document manager.

Those documents are still visible within the rest of DME however the 'check out' option is no longer available on the right click menu. If other users attempt to open the document, they receive a message informing them who has the document checked out and when it was checked out (similar to the message received when a document is in use.)

If the user selects 'check out' from the right click menus available from with DME dialogs, the following process occurs:
1. DME sets a flag in the object Store by setting the Status property to CHECKED_OUT and by inserting the time and user's name in StatusInfo property.
2. DME copies the object from the public DME store to the user's location on the physical file system.

When a user wishes to check a document in, they must be connected to the network. The Check-ed out copy of the document is moved to the DME object store and the flag is reset in the DME object store. If the object does not exist in the DME store (i.e., it was created offline), then it is added to the store.

MICROSOFT WINDOWS 95 (NT Workstation) Desktop Integration (Shell Extensions)

DME modifies the following parts of the MICROSOFT WINDOWS 95 (trademark of Microsoft Corporation for an operating system) (Windows NT) shell:
1. DME folders are added to the MICROSOFT WINDOWS EXPLORER and MICRO-SOFT OUTLOOK 97.
2. The Start Menu is modified.
3. An application is added to the system tray.
4. An item is added to the context (right click) menu for some document types.

MICROSOFT WINDOWS 95 EXPLORER (Namespace Extensions)

A DME name space extension is added to the shell. This appears as a child of 'My Computer' in MICROSOFT EXPLORER (trademark of Microsoft Corporation for an Internet brower.) DME contains a folder named 'My Documents' which contains the results of a stored query of DME that returns all (within a preset limit) documents for which the user is the creator.

The user may create other sub-folders of the DME object by saving searches of the document set. When the user saves searches in Document Management Extensions for MICROSOFT EXCHANGE, those searches appear as sub-folders of the DME object.

MICROSOFT OUTLOOK 97 (Name Space Extensions)

Browsing Documents

DME is logically an extension of the file system (rather than the messaging system) and should therefore appear as such in MICROSOFT OUTLOOK 97. The folder 'Document Manager' is a shortcut to the name space extension found in WINDOWS EXPLORER, which gives access to one's saved searches and works in a similar manner as the 'My Documents' shortcut which points to the system folder 'My Documents' on the local drive of the host. The DME document store will not appear as part of the MICROSOFT EXCHANGE (trademark) Folder Tree either as a public folder or as a private folder.

System Tray

A quick find icon has been added to the Start Bar Status Area (sometimes called the system tray) located on the lower right of screen when the Start Bar is in default horizontal orientation. The icon permits a quick retrieval from DME on the basis of document number or provides faster access to the DME Find Documents application.

Start Menu

The Start Menu has been modified in several ways:
1. A command called 'In the Document Manager' has been added to the Find menu using a shell extension.
2. The 'Open from Document Manager' command has been added to the start bar which launches a DME open dialog rather than the standard OSA.exe dialog.
3. The list of recent edits will be accessible under the 'Documents' menu. This will be done using a doclink shell extension.

Document Find

The "In the Document Manager . . . " option on the start menu under Find launches an application for searching the DME store that is almost identical in appearance to the normal MICROSOFT WINDOWS 95/NT4 Find program.

The application permits searching on all DME properties and permits viewing of object properties and setting of permissions. Context menus also deliver check out functionality from the search dialog. From this dialog, the user is able to save searches and retrieve those searches using a folder tree drop. Full text searching is also available from this dialog (see full text searching below). "Send to" and "Send link" functionality in the Find Application enables the user to send documents and searches to others in both an organization and outside the organization.

Context Menu

Context menu handlers (a form of shell extension) have been used to add menu items to the context menu for all potential DME file objects when they are displayed outside a DME component. The context menu is displayed when a user clicks a file object with the alternate (usually the right) mouse button. If the object is capable of import to DME an item is added to the 'Send to' menu, being 'send to Document Manager'.

Within DME dialogs a context menu that presents the following options appears:

Open: which is the default (double click) option and which launches the appropriate application and opens the file.

Check Out: which is disabled if the document is already checked out.

Check In: which is disabled if the document is already checked in.

Properties: which displays the properties screen and which permits the viewing and editing of document properties or attributes. Date created field and date modified fields are also part of this dialog. Further to this, a history of document change events can be captured for each document or for all documents in a store. Users can see a full history of transactions on their documents directly from any property dialog. They can also turn the history on or off without affecting the server side audit trail.

Status: the status field permits the implementation of simple workflow and contains choices such as draft and published—Administration configurable.

Back End Functionality

MICROSOFT EXCHANGE Object Store

DME uses the Fulcrum Knowledge Network Server to index and search the message store. The administrator can configure the Index to cover one or more Server folders within the Object store. A user is able to see whichever indices he/she has permission to search. A user (other than the administrator) cannot see the structure of the store and is not aware of that structure. Each server has a unique identifier which coupled with a document number (e.g. Serverl-2345) provides a unique identifier for the Exchange organization.

Document Management Extensions for MICROSOFT EXCHANGE's Object Store and structured index is contained in full within MICROSOFT EXCHANGE 5.0 public information store. The public information store within MICROSOFT EXCHANGE is, in fact, a database used as a message store and messaging system.

Security

To function as a document management system, DME must prevent uncontrolled and unauthorized access to its object store. The only method of access to the DME store is programmatically (i.e., via Document Management Extensions for MICROSOFT EXCHANGE). DME implements access security using the MICROSOFT EXCHANGE address book. The type of security applicable to a document is similar to that of an exchange folder. Since no user except the administrator can access the store without using DME, the MICROSOFT EXCHANGE Server automatically implements all external (to Document Management Extensions for MICROSOFT EXCHANGE) security.

Read/Write Permission and Search Permission

Read/Write access allows the user to change the document and properties but restricts them from changing permissions or deleting them. The permission setting is useful in team collaboration environments where the team leader is able to set the permissions on the document and everyone else can work on it but may not change the permissions or delete them.

Search access allows a user to discover the item through searching and view the properties but not open the site. This permission setting allows others in the organization to know of the existence of a document, however, it does not enable a person to read the document without first contacting the author. An example of this is where an organization would wish to have people know that it had done research on Intranets without having them necessarily having the right to read the research.

Time-Based Archive Delete

All items can be flagged for archive or delete after a specified period of time based on the document type allocated to that item. Organizations can therefore enforce a time-based delete or archive policy by setting a time limit based on the document type, which can be overridden if necessary.

Users, on the other hand, may set any document level security attribute except delete using a DME interface to the MICROSOFT EXCHANGE security settings.

Replication

Replication is supported only on a whole of document set basis in MICROSOFT EXCHANGE Release 5.0. In Release 5.5 in the future, administrators will be permitted to specify a document type as capable of individual replication. This means that documents of the type replicable will be copied to a public folder that is included in the MICROSOFT EXCHANGE replication system.

Full Text Searching

Full text searching is available on all DME documents. The user accesses the functionality either from a DME 'Open' dialog within a supported application ('Find in Text' field) or via the 'Find Document' item on the MICROSOFT WINDOWS 95 (NT Workstation) operating system 'Start' menu and other up-dates of the MICROSOFT WINDOWS operating system. The user may also use MICROSOFT INTERNET EXPLORER (trademark for Internet browser by Microsoft Corporation) for a based full text (or attribute) search.

DME use the FULCRUM (trademark) Knowledge Network and FULCRUM Exchange Connector to provide this functionality.

Administrator Options

There are very few administrator options supported by DME in keeping with the policy of "its already there don't rebuild it. " User access is administered via the MICROSOFT EXCHANGE address books. Secure access to documents is administered at the user level. The only administrator override being that the administrator has open access on all documents.

In addition to all MICROSOFT EXCHANGE administration options, the MICROSOFT EXCHANGE administrator is able to:

1. Create and delete Document Types.
2. Set archive properties (and eventually replication properties) in relation to those Document Types.
3. Search across the whole document management extension organization—(Global Administrator Search) regardless of document permission, but is unable to open or view documents without explicit permission.

User Interface

Document Production Application Integration

File Open and File Save/Save As

All applications supported by DME use identical File Open and File Save/Save As dialogs.

DME File Open Screen

DME intercept all file interactions in supported applications and replace the standard dialogs with DME dialogs. The DME dialogs are almost identical in appearance and behavior to their MICROSOFT OFFICE 97 (trademark of Microsoft Corporation) and updates counterparts. An interesting feature of the Save dialog is that in remaining consistent with the Microsoft "look and feel," a form of Auto-Profiling has been implemented. When a user single left clicks on an existing document, DME fill in all profile fields for that document. All a user need do is identify a document which is like the one being saved, click on it and change the name (or any other attribute) to complete the profiling of that document. They need not change anything, but then a new document will be created with exactly the same attributes (which could lead to confusion when the user wishes to retrieve the document). In a document management system, the only unique attribute is the document number.

Internet Browser Integration

DME supports a Browser interface that permits remote searching and browsing of documents using the MICROSOFT OFFICE (MICROSOFT WORD, MICROSOFT EXCEL and MICROSOFT POWERPOINT 97) viewers. Though editing was not available in Release 5.0 it has become available in subsequent document management extension programs.

Versioning

DME versioning is identical in look and feel to the existing MICROSOFT WORD 97 and updates versioning.

Similar versioning dialogs have been added to Office Applications that do not directly implement versioning. The DME versioning dialogs implement versioning within DME. This form of versioning is one set of properties to many versions of the document.

Linking

This feature allows users to link documents to each other. Users can specify one or two way logical links between related documents and linked information can be viewed from any search result in the DME Find Client.

MICROSOFT WINDOWS 95 (NT Workstation) Desktop Integration

DME modifies the following parts of the MICROSOFT WINDOWS 95 (Windows NT) operating system desktop:
1. DME folders are added to the MICROSOFT EXPLORER 95 and MICROSOFT OUTLOOK 97.
2. The Start Menu is modified.
3. An application is added to the system tray.
4. An item is added to the context (right click) menu for some document types.

MICROSOFT WINDOWS 95 EXPLORER

"Document Manager" appears as a child of 'My Computer' in MICROSOFT EXPLORER Internet browser. "Document Manager" contains a folder named 'My Documents' which contains the results of a stored query of DME that returns all (within a preset limit) documents for which the user is the creator.

The user may create other sub-folders of the "Document Manager" folder by saving searches of the document set. When the user saves searches in Document Management Extensions for MICRO-SOFT EXCHANGE, those searches appear as sub-folders of the "Document Manager" folder.

MICROSOFT OUTLOOK 97

Browsing Documents

DME is logically an extension of the file system (rather than the messaging system) and should therefore appear as such in MICROSOFT OUTLOOK 97. The folder 'Document Manager' is a shortcut to the namespace extension found in MICROSOFT WINDOWS EXPLORER which gives you access to your saved searches and works in a similar manner as the My Documents' shortcut which points to the system folder 'My Documents' on the local drive of the host. The DME document store will not appear as part of the MICROSOFT EXCHANGE Folder Tree either as a public folder or as a private folder.

Journal

Documents accessed via DME will update the MICROSOFT OUTLOOK 97 journal. This effectively provides a history functionality of the document management system at a user view level.

System Tray

A quick find icon has been added to the Start Bar Status Area (sometimes called the system tray) located on the lower right of screen when the Start Bar is in default horizontal orientation. The icon permits a quick retrieval from DME on the basis of document number or provides faster access to the DME Find Documents application.

Start Menu

The Start Menu has been modified in several ways:
1. Command called 'In the Document Manager' has been added to the Find menu using a shell extension.
2. The 'Open from Document Manager' command has been added to the start bar which launches a DME open dialog rather than the standard OSA.exe dialog.
3. The list of recent edits will be accessible under the 'Documents' menu. This will be done using a doclink shell extension.

Document Find

The "In the Document Manager" found under the Find option on the start menu launches an application for searching the DME store that is almost identical in appearance to the normal MICROSOFT WINDOWS 95/NT4 Find program.

The application permits searching on all DME properties and permits viewing of object properties and setting of permissions. Context menus also deliver check out functionality from the search dialog. From this dialog, the user is able to save searches and retrieve those searches using a folder tree drop down. Full text searching is also available from this dialog.

Context Menu

Menu items have been added to the context menu for all potential DME files when they are displayed outside a DME dialog. The context menu is displayed when a user clicks a file object with the alternate (usually the right) mouse button. If the object is capable of import to DME, an item is added to the 'Send to' menu, being 'send to Document Manager'.

Within DME dialogs a context menu that presents the following options appears:

Open: which is the default (double click) option and which launches the appropriate application and opens the file.

Check Out: which is disabled if the document is already checked out.

Check In: which is disabled if the document is already checked in.

Properties: which displays the properties screen and which permits the viewing and editing of document properties or attributes. Date created field and date modified fields are also part of this dialog. Further to this, a history of document change events can be captured for each document or for all documents in a store. Users can see a full history of transactions on their documents directly from any property dialog. They can also turn the history on or off without affecting the server side audit trail.

Status: The status field permits the implementation of simple workflow and contains choices such as draft and published—Administration configurable.

Records Management

The Document Management Extension System has many record management features which include the following:

Custom Records Management HTML Forms

A DME Administrator (or user) can create HTML forms using a simple HTML editor (such as MICROSOFT FRONT PAGE EXPRESS, a trademark of the Microsoft Corporation) for use as a data entry form for Records Management purposes.

Organizational forms can be simply and efficiently designed and implemented as Standard Data Capture forms for Records management or any other data capture process.

Record Viewer Application

The DME Record Viewer allows a user to retrieve/complete/view/save HTML Records Management Forms.

The ODMA compliant HTML forms viewer allows standard HTML forms to be treated just like any other managed object. Users can load a form, enter the required data and save the form (complete with data) as a new DME document.

Records Management is just one of the possible uses for the new Forms technology.

Permanent Records

Users can flag a DME object (including the HTML Records Management Forms) as permanent. The effect of this is to freeze an object in a 'published' state.

When an object is flagged as permanent, it cannot be unflagged, modified or deleted. To records management, this is a preservation feature and to others this is a publication feature as the object is effectively frozen at that point of time.

Records Manager User Class

DME Administrators can specify a group of users who have modify rights in respect of all permanent objects.

Organizations can designate certain users as being part of the Record Manager Group. Those users have modify permission in relation to permanent objects. This permits the designation of specialist Records Managers.

It is envisaged that other embodiments of the invention will exhibit any number of, and any combination of, the features of the previously described two embodiments.

While we have described herein one specific embodiment of the invention, it is to be understood that variations and modifications in this can be made to the invention without departing from the spirit and scope thereof.

We claim:

1. A document management extension system for use as an extension to a document collection and management software program, said document management extension system comprising:
   an information store comprising a database and a messaging system for storing documents managed by a document collection and management software program, with means for storing documents in only one or both of said database and said messaging system, and with stored documents being stored in said database or said messaging system of said information store;
   means for document indexing of said database or said messaging system of said stored documents stored solely in said information store; and,
   means for processing said stored documents in either said database or said messaging system.

2. The document management extension system according to claim 1, further comprising a user interface accessible through a dialog in a software application program.

3. The document management extension system according to claim 1, further comprising a user interface accessible through a dialog in a software "find" application program.

4. The document management extension system according to claim 1, further comprising document and messaging software.

5. The document management extension system according to claim 1, further comprising means for launching an application for searching a document store.

6. The document management extension system according to claim 5, wherein said means for launching an application for searching a document management extension store includes means for allowing searching on all document management extension properties and means for allowing viewing of object properties and setting of permissions.

7. The document management extension system according to claim 6, further comprising document management extension dialogs having a context menu, said context menu having an open function for launching a software application or for opening a file.

8. The document management extension system according to claim 6, further comprising document management extension dialogs having a context menu, said context menu having a "check-out" function capable of being disabled which, if said "check-out" function is disabled, signifies that a document has already been "checked-out."

9. The document management extension system according to claim 6, further comprising document management extension dialogs having a context menu, said context menu having a properties function capable of displaying a properties screen and for permitting viewing and editing of a document's properties.

10. The document management extension system according to claim 1, further comprising a document exchange extension record viewer for allowing retrieval by a user of HTML records management forms.

11. The document management extension system according to claim 1, further comprising a document exchange extension record viewer for allowing completion by a user of HTML records management forms.

12. The document management extension system according to claim 1, further comprising a document exchange extension record viewer for allowing viewing by a user of HTML records management forms.

13. The document management extension system according to claim 1, further comprising a document exchange extension record viewer for allowing saving by a user of HTML records management forms.

14. The document management extension system according to claim 1, wherein said database for said stored documents includes a profile of said stored documents.

15. A document management extension system for use as an extension to a document collection and management software program, said document management extension system comprising:
   a database for storing documents managed by a document collection and management software program;
   means for document indexing of said database of stored documents;
   means for processing said stored documents in said database; and,
   software providing for when a network or server fail, while a document is open, a user is able to continue working, even if the user is unaware that the network or server has failed.

16. The document management extension system according to claim 15, wherein said software providing for when a network or server fail includes provision so that when the network or server are again available, an off-line file of the user automatically re-synchronizes with the server.

17. The document management extension system according to claim 16, further comprising software for enabling the user to check documents out to a local machine of the user, the user using a "check-out" command available in any dialog.

18. The document management extension system according to claim 17, wherein said software for enabling the user to check documents out includes a provision for informing a subsequent user who attempts to open a document that the document has been "checked-out" and the time when the document was "checked-out."

19. A document management extension system for use as an extension to a document collection and management software program, said document management extension system comprising:
   an information store comprising a database and a messaging system for storing documents managed by a document collection and management software program, with means for storing documents in only one or both of said database and said messaging system, and with stored documents being stored in said database or said messaging system of said information store;
   means for document indexing of said database of stored documents;
   means for processing said stored documents in said database; and,
   means for launching an application for searching a document store being carried out by a command in a "Start Menu."

20. A document management extension system for use as an extension to a document collection and management software program, said document management extension system comprising:
   a database for storing documents managed by a document collection and management software program;
   means for document indexing of said database of stored documents;
   means for processing said stored documents in said database;
   means for launching an application for searching a document management extension store includes means for allowing searching on all document management extension properties and means for allowing viewing of object properties and setting permissions; and,
   document management extension dialogs having a context menu, said context menu having a status function for allowing an implementation of workflow and including options of draft or published.

21. A document management extension system for use as an extension to a document collection and management software program, said document management extension system comprising:
   a database for storing documents managed by a document collection and management software program;
   means for document indexing of said database of stored documents;
   means for processing said stored documents in said database; and,
   means for preventing an uncontrolled and unauthorized access to an object store of said document management extension system.

22. The document management extension system according to claim 21, wherein said means for preventing an uncontrolled and unauthorized access to an object store allows a user to set any document level security attribute, except "delete" using a document management exchange interface to exchange security settings.

23. The document management extension system according to claim 21, wherein said means for preventing an uncontrolled and unauthorized access to an object store allows a user to alter a document and properties, while restricting the user from altering permissions or deleting permissions.

24. The document management extension system according to claim 21, wherein said means for preventing an uncontrolled and unauthorized access to an object store allows a user to conduct a search for a document and view the document, but does not allow the user to open the document.

25. The document management extension system according to claim 21, wherein said means for preventing an uncontrolled and unauthorized access to an object store allows for a time-based archiving and deletion, so that after a specified time, a document is able to be archived or deleted.

26. The document management extension system according to claim 25, wherein said time-based archiving and deletion is capable of being overridden.

27. The document management extension system according to claim 21, wherein said means for preventing an uncontrolled and unauthorized access to an object store allows for replication on a whole of document set basis.

28. The document management extension system according to claim 21, wherein said means for preventing an uncontrolled and unauthorized access to an object store allows for replication on an individual document basis.

29. A document management extension system for use as an extension to a document collection and management software program, said document management extension system comprising:
   an information store comprising a database and a messaging system for storing documents managed by a document collection and management software program, with means for storing documents in only one or both of said database and said messaging system and with stored documents being stored in said database or said messaging system of said information store;
   means for document indexing of said database of stored documents;
   means for processing said stored documents in said database; and,
   means for linking documents to one another via specifying one-way logical links between related documents.

30. A document management extension system for use as an extension to a document collection and management software program, said document management extension system comprising:
   an information store comprising a database and a messaging system for storing documents managed by a document collection and management software program, with means for storing documents in only one or both of said database and said messaging system, and with stored documents being stored in said database or said messaging system of said information store;
   means for document indexing of said database of stored documents;
   means for processing said stored documents in said database; and,
   means for linking documents to one another via specifying two-way logical links between related documents.

31. A document management extension system for use as an extension to a document collection and management software program, said document management extension system comprising:
- a database for storing documents managed by a document collection and management software program;
- means for document indexing of said database of stored documents;
- means for processing said stored documents in said database; and,
- means for flagging by a user a document management extension object as permanent.

* * * * *